United States Patent
Burgin et al.

(10) Patent No.: US 10,713,072 B1
(45) Date of Patent: Jul. 14, 2020

(54) COMPUTING RESOURCE PROVISIONING

(71) Applicant: AMAZON TECHNOLOGIES, INC., Seattle, WA (US)

(72) Inventors: Joshua Marc Burgin, Seattle, WA (US); Anupama Sharma, Seattle, WA (US); Dmitry Pushkarev, Palo Alto, CA (US); Derek Solomon Pai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 991 days.

(21) Appl. No.: 15/193,239

(22) Filed: Jun. 27, 2016

(51) Int. Cl.
*G06F 9/00* (2006.01)
*G06F 9/455* (2018.01)
*G06Q 10/06* (2012.01)
*G06F 9/50* (2006.01)
*H04L 12/24* (2006.01)
*H04L 29/08* (2006.01)

(52) U.S. Cl.
CPC ........ *G06F 9/45558* (2013.01); *G06F 9/5077* (2013.01); *G06Q 10/06315* (2013.01); *H04L 41/12* (2013.01); *H04L 41/145* (2013.01); *H04L 67/1002* (2013.01); *G06F 2009/4557* (2013.01); *G06F 2009/45562* (2013.01); *Y04S 10/54* (2013.01)

(58) Field of Classification Search
None
See application file for complete search history.

(56) References Cited

U.S. PATENT DOCUMENTS

| | | | | |
|---|---|---|---|---|
| 6,662,221 B1* | 12/2003 | Gonda | ............... | H04L 12/4641 370/254 |
| 7,849,462 B2* | 12/2010 | Traut | ................... | G06F 9/455 718/1 |
| 7,890,951 B2* | 2/2011 | Vinberg | ................. | G06F 8/65 709/203 |
| 8,005,991 B2* | 8/2011 | Lo | ....................... | G06F 9/5077 709/233 |
| 8,122,116 B2* | 2/2012 | Matsunaga | .......... | G06F 3/0626 370/254 |
| 8,176,486 B2* | 5/2012 | Amir Husain | .......... | G06F 9/445 718/1 |
| 8,191,065 B2* | 5/2012 | Frank | ................. | G06F 9/45558 718/1 |
| 9,830,192 B1* | 11/2017 | Crouchman | ........ | G06F 9/45558 |

(Continued)

*Primary Examiner* — Gurkanwaljit Singh
(74) *Attorney, Agent, or Firm* — Blank Rome LLP

(57) ABSTRACT

Systems and methods permit customers of a service provider network to specify various constraints on a desired fleet of virtual machine instances without having to specify the hardware types of instances to be included in the fleet. Instead, the customer can specify per-instance hardware constraints (number of CPUs, amount of memory, etc.) and job constraints (e.g., deadline, budget, application type, etc.). A provisioning service accesses an internal database containing instance cost data, instance availability data, and mappings between application type and fleet configurations to propose a fleet of instances that complies with the customer-specified per-instance hardware and job constraints, thereby freeing the customer from having to be conversant in the particular instances offered by the service provider.

15 Claims, 5 Drawing Sheets

(56) References Cited

U.S. PATENT DOCUMENTS

| | | | |
|---|---|---|---|
| 9,830,566 B1 * | 11/2017 | Dailianas | G06Q 10/0631 |
| 9,858,123 B1 * | 1/2018 | Dailianas | G06F 9/45558 |
| 9,888,067 B1 * | 2/2018 | Yemini | H04L 67/1023 |
| 10,191,778 B1 * | 1/2019 | Yang | G06F 9/45558 |
| 2003/0144894 A1 * | 7/2003 | Robertson | G06Q 10/06 709/226 |
| 2006/0025985 A1 * | 2/2006 | Vinberg | G06F 8/65 703/22 |
| 2006/0037002 A1 * | 2/2006 | Vinberg | G06F 8/65 717/124 |
| 2006/0155674 A1 * | 7/2006 | Traut | G06F 8/61 |
| 2006/0155735 A1 * | 7/2006 | Traut | G06F 9/445 |
| 2007/0006218 A1 * | 1/2007 | Vinberg | G06F 8/61 717/174 |
| 2007/0043860 A1 * | 2/2007 | Pabari | G06F 9/5072 709/224 |
| 2007/0300220 A1 * | 12/2007 | Seliger | G06F 8/61 718/1 |
| 2008/0189700 A1 * | 8/2008 | Schmidt | G06F 11/203 718/1 |
| 2008/0222234 A1 * | 9/2008 | Marchand | H04L 12/1877 709/201 |
| 2008/0263553 A1 * | 10/2008 | Lueck | G06F 9/505 718/102 |
| 2009/0260007 A1 * | 10/2009 | Beaty | G06F 9/5077 718/1 |
| 2009/0300608 A1 * | 12/2009 | Ferris | G06F 9/45558 718/1 |
| 2009/0327471 A1 * | 12/2009 | Astete | G06F 9/45533 709/223 |
| 2011/0239010 A1 * | 9/2011 | Jain | G06F 1/3209 713/310 |
| 2013/0138812 A1 * | 5/2013 | Assuncao | G06F 9/50 709/226 |

* cited by examiner

COMPUTING RESOURCE PROVISIONING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Service providers may offer a large assortment of types of virtual machines optimized for different use cases. One virtual machine type may differ from another in terms of a combination of central processing units (CPUs), memory, storage, networking capacity, etc. For example, one virtual machine type may be optimized for general purpose use balancing compute, memory and network resources, while another virtual machine type may be compute-optimized featuring high performance CPUs. Another virtual machine type may be optimized for memory-intensive applications. Further, within each family of virtual machine types, a service provider may offer varying sizes of virtual machines in terms of number of CPUs, amount of memory, amount of local storage, etc.

BRIEF DESCRIPTION OF THE DRAWINGS

For a detailed description of various examples, reference will now be made to the accompanying drawings in which.

DETAILED DESCRIPTION

Figure 1:
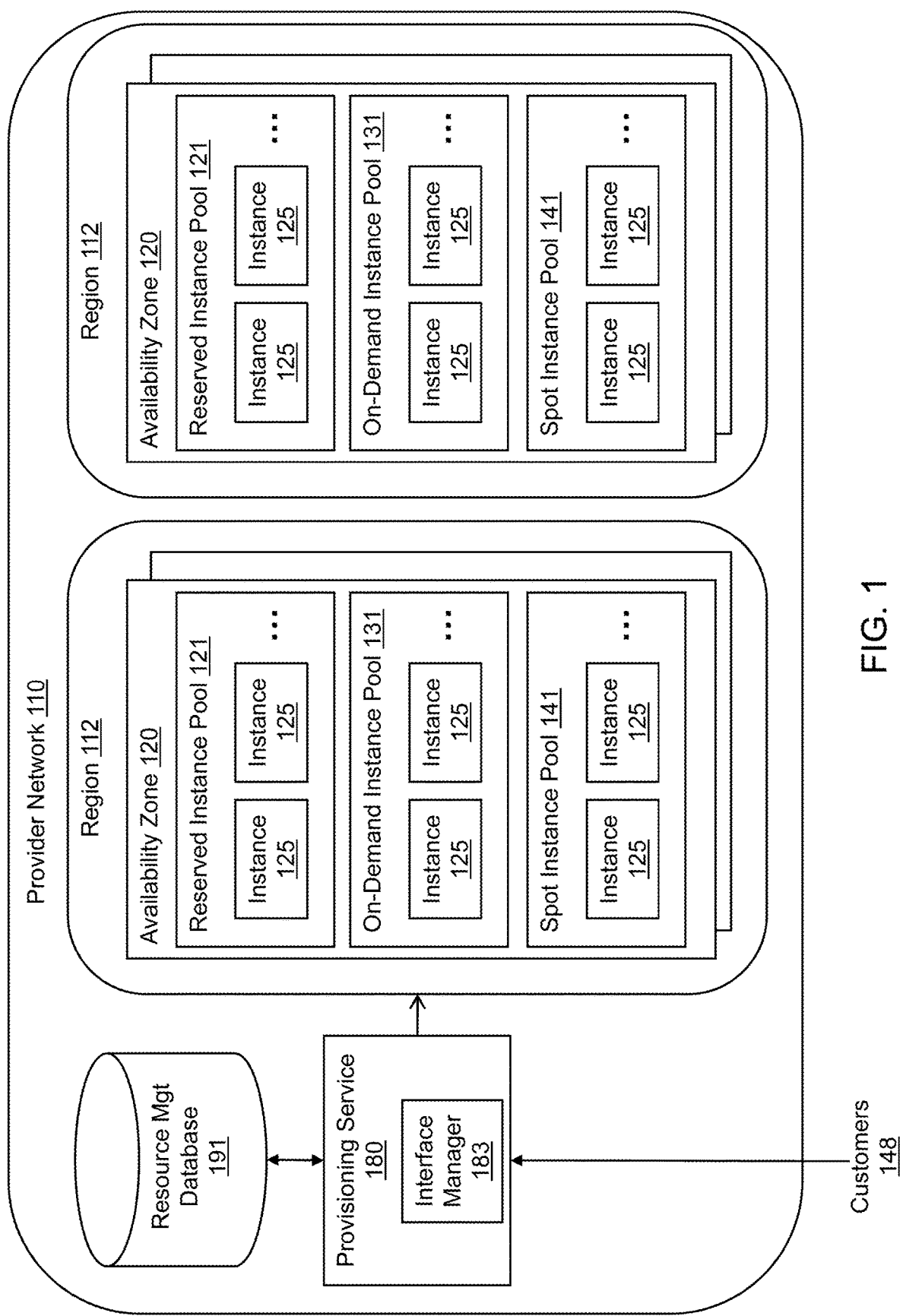
FIG. 1 shows an embodiment of a provider network in accordance with various examples.

As noted above, some virtual machine service providers offer a large number of types of virtual machines and may even offer varying sizes of each virtual machine type. While a large number of types and sizes of virtual machines is advantageous to satisfy the needs of service provider customers with diverse application needs, providing a large "menu" of instance type and/or size choices can be cumbersome to customers during the process of choosing an appropriate set of virtual machines to satisfy their operational needs. For example, some customers may need a large batch processing job to be completed without interruption. For a given customer, the job may take 8 hours to run depending on the type and number of virtual machines chosen to perform the job. The job may be compute intensive but not memory intensive. The customer may not care how long the job takes to complete as long as it is completed by a certain deadline and costs less than a given budget. Another customer may want to have a web application hosted on virtual machines of a service provider's network and expects to have thousands of users access the web application at any point in time. Load balancers may be needed to help balance the incoming user traffic to a large number of back-end application virtual machines. Other customers may have different operational needs for the service provider's network.

In accordance with the disclosed embodiments, rather than forcing customers of the service provider to be conversant as to the numerous different types and sizes of virtual machines offered by the service provider, customers are able to specify such input constraints as hardware characteristics about the virtual machines they desire, the type of application the customers intend to run on the service provider network, a time duration (e.g., deadline) for completing a task, and a budget value. The term "budget" may refer to, for example, any of a per-hour budget, a total job completion budget, or a budget that specifies a cost for a certain amount of output. A customer may specify some or all of these types of inputs. Virtual machines may be referred to herein as "virtual machine instances" and further, for convenience, as "instances."

In one example, a customer may specify that each of the customer's instances should have a certain number of CPUs and a certain amount of memory, that a batch job is to be performed that ideally should not be interrupted, that the job needs to be completed by 12 pm five days from now, and that the job should not cost more than $200 to complete. As long as those requirements are met, the customer does not care what types of instances are used, the number of instances, whether the instances deployed for the customer's batch job are all of the same type or are instances of two or more types, whether the job starts now, tomorrow, or the next day, the per-hour cost to run the job, etc. As long as the total job cost is $200 or less, the job completes by the appointed deadline, is not interrupted, and is executed on instances with the specified number of CPUs and amount of memory, the customer does not otherwise care about the instances chosen to complete the job.

Another customer may specify that each of the customer's instances should have a certain number of CPUs and a certain amount of memory (likely different from the customer of the example above), that the application is a web application for which interruption is tolerated, that a specified amount of traffic should be expected to the web application, and that the per-hour cost to the customer should not exceed $1. As long as those restrictions are met, this particular customer does not care what instances are chosen to execute the web application.

Each customer in these examples can specify the corresponding inputs to a provisioning service executing on the service's providers network. The provisioning service provisions instances on behalf of the service provider's customers. The provisioning service may create instances, terminate instances, etc. The provisioning service described herein can access a database containing the availability of different types of instances, the current pricing of such instances, price history of instances whose prices may dynamically fluctuate with supply and demand, and data that maps application types to instance or instance fleet configurations. Using the customer's specified inputs, the provisioning service accesses the database to define a fleet of instances suitable for the customer. The fleet may be defined in terms of the number of instances in the fleet (one or more), the types of instances in the fleet, the availability zones in which the instances are to be executed, etc.

For example, a customer may have specified hardware requirements including that each instance should have 4 CPUs and 2 GB of memory, that a certain type of application type (e.g., batch processing, web application, etc.) is to be run on the instances, and that the job should be completed for no more than $150 dollars by Friday at 2 pm. Using those requirements, the provisioning service determines the instances that are available that conform to the hardware requirements specified by the user (i.e., 4 CPUS and 2 GB of memory for each instance). Further, the provisioning service accesses the database to determine, for the specified application type, that the job can be interrupted. Further, the data in the database for the application type may indicate that the instances should be created for the customer in two or more different availability zones (e.g., logical data centers, virtual data centers, etc.) to reduce the risk of a failure in one availability zone impacting all of the customer's instances. Launching instances in the same availability zone may reduce latency, but launching instances in different availability zones may increase fault tolerance. Further still, the database's pricing data indicates that the customer's job can be completed for less than $150 and at the lowest cost possible if the instances are run at night rather than during the day. The provisioning service may propose to the customer a particular fleet of instances to satisfy the customer's requirements. The proposed fleet may include 100 instances with 50 instances running in one availability zone and 50 instances running in a different availability zone. Further, the 50 instances running in each availability zone may include a particular mix of "on demand" instances (described below) and instances whose price dynamically fluctuates with supply and demand ("spot" instances). Aside from the pricing policy of the instances, the provisioning system may determine that a mix of instances of two different types is appropriate for the customer. One type of instance may differ from another in terms of the mix of number of CPUs, amount of memory, local versus remote storage, networking performance, etc. The fleet proposed by the provisioning service for another customer, however, may be that all of the instances should be located in the same availability zone and be of the same type and same pricing plan.

In some embodiments, the provisioning service may provide the customer with the proposed fleet configuration or multiple suggestions for suitable fleet configurations. The customer may be prompted to confirm the suggested fleet proposal or select one if multiple fleets are proposed. In other embodiments, the provisioning service may implement (e.g., launch at an appropriate point in time) the fleet configuration determined by the provisioning system without confirmation from the customer.

The provisioning service thus creates instances for customers to complete a given task without requiring the customers to be conversant or even aware of the various types of instances offered by the service provider. Instead, the customers can specify basic hardware requirements and job objectives and the provisioning service can determine a suitable fleet of instances for the customers.

FIG. 1 illustrates a system in accordance with at least some embodiments. The system includes a provider network 110 comprising a plurality of geographical regions 112. Each geographical region 112 may include one or more availability zones 120. An availability zone may be thought of as a logical data center and could map to one or more physical data centers. Each availability zone 120 in turn may include a plurality of instances 125. An instance may be a virtual machine which runs on a physical server. The instances may be organized into various resource pools in some embodiments, such as a reserved instance pool 121, an on-demand instance pool 131, and an interruptible instance pool 141 (also termed and shown in FIG. 1 as a spot instance pool). The various instances 125 in the different availability zones 120 may be reserved and/or allocated for use by customers 148 (e.g., customers of the operator of the provider network 110). The number of instances 125 in each pool can vary over time and between the various pools, and is generally controlled by a resource manager to help ensure sufficient resources are available in the various pools. Although the instances 125 illustrated in FIG. 1 are shown as belonging to availability zones 120, in other embodiments the provider network 110 may be organized differently: e.g., in some embodiments availability zones may not be implemented. Instance pools may be implemented within availability zones in some implementations (e.g., each availability zone may have its own reserved instance pool), while in other implementations an instance pool or sub-pool may span multiple availability zones.

In the illustrated embodiment, the provider network 110 includes a resource provisioning service 180 operable to perform a variety of operations in response to requests submitted by customers 148. The provisioning service 180 may be implemented on one or more servers executing software to perform the operations described herein as attributed to the provisioning service 180. In some embodiments, such as those described herein, the provisioning service 180 may be implemented as multiple services executing on servers. An interface manager component 183 of the provisioning service 180 in some embodiments may implement one or more programmatic interfaces allowing customers 148 to submit requests for instances 125 to be created on behalf of the customer. For example, the interface manager 183 may receive a request from a customer 148 to create instances in accordance with certain hardware requirements (e.g., CPU, memory, storage, etc.) and job requirements (deadline for completion of job, budget for job, type of application, etc.). The provisioning service 180 processes the customer's hardware and job-related input constraints and proposes or launches a fleet of instances suitable for the customer as explained below. A fleet of instances for a customer may include one or more instances.

Instances include one or more CPUs and customers can specify the number of CPUs that should be included in each instance selected by the provisioning service 180 for the customers' fleets. In some examples, a CPU refers to a physical device (e.g., a processing core). However, because different types of CPUs have different performance characteristics, the term virtual CPU ("vCPU") may be used. A vCPU can be defined in any of a variety of ways. For instance, a vCPU can be a single hyperthread of a particular multithreaded CPU core such as an Intel Xeon core. The term vCPU enables a more meaningful standardization of CPUs and numbers of CPUs. As used herein, the term CPU may refer to either physical devices or vCPUs.

In some embodiments, the "customer" that specifies the requirements to be used by the provisioning service 180 to form a fleet is an account holder of the service provider. The customer in this context is a person that logs in to his or her account and interacts with the interface manager 183 to have a fleet created by the provisioning service 180 on behalf of the customer.

In other embodiments, a "customer" may refer to a service that executes within the provider network 110. In this latter context, the service may respond to a request by a person to execute the service to perform a function, and the service may respond to the request by requesting the provisioning service 180 to create a fleet. The service requesting the provisioning service 180 to create a fleet is the "customer." The service requesting the creation of a fleet may need one or more instances to be created to perform a task for a person that requested the task to be performed. For example, the service/customer may be a game-related service that deploys, operates and scales a session-based multiplayer game. In another example, the service/customer may be a MapReduce function that can process a large amount of data by distributing the workload across a cluster of multiple instances. The cluster may be managed using an open-source framework such as Hadoop.

Each instance pool 121, 131, and 141 may have associated resource management and pricing policies which govern, for example, whether a reservation or allocation of a resource instance can be interrupted, whether reservations of one customer can be resold to another, the different types of static and dynamic pricing rates in effect for instances of the pool, and so on. The various types of instance pools 121, 131, 141 may be the same or different between the various availability zones 120 within a region 112 and may be the same or different between the different regions. The pools may represent logical collections or aggregations. For example, the presence of two instances in the same pool or sub-pool may not necessarily imply anything about the physical location of the hardware used for the two instances.

The reserved instance pool 121 includes resource instances that may be reserved as a group for fairly long periods of time, such as one-year terms, three-year terms, etc. by paying a low, one-time, upfront payment for the resource instance, and then paying a low hourly rate for actual use of the instance at any desired times during the term of the reservation. Thus, a long-term reservation assures that the reserved instance will be available whenever it is needed. When purchasing a reservation, various options can be specified such as the number of instances in the reservation, the type of instances, the length of the reservation period, etc. A location policy also can be specified for the reservation of the group of instances. Instances within a reservation are not launched until the customer decides to do so, but because the instances have been reserved, their launch within the provider network is essentially guaranteed.

The on-demand instance pools 131 do not require a long-term reservation and are purchased when needed for however long the need persists. The pricing policy for the on-demand instance pools 131 may allow the customer 148 to pay for resource capacity by the hour with no long-term commitment or upfront payments. The resource capacity used may be readily decreased or increased based on application needs, and the customer 148 only pays the hourly rate for the instances used.

The spot instance pools 141 provide another type of resource purchasing and allocation model. The price of instances in a given spot instance pool 141 varies with supply and demand effects. Instances from any of the spot instance pools 141 can be purchased for a guaranteed maximum price that is specified (the "bid price"). If the bid price equals or exceeds the current spot price for a desired instance, the instance is activated and assigned for exclusive use by the customer. Thus, the upper limit that will be paid for a given spot instance is known apriori. However, spot instances are interruptible in that the spot price may eventually exceed the bid price. If and when that happens, the spot instance is terminated.

In some embodiments, the service provider offers different types of instances to its customers. Instances of different types may vary in terms of their mix of central processing unit (CPU), memory, network ports, etc. The provider network 110 may include computing devices such as servers that are configured to host specific instance types and sizes. That is, each type of server may host a specific type and size of instance. If the service provider offers, for example, eight different types of instances, the provider network 110 includes eight different types of servers. Each pool 121, 131, and 141 may include multiple pools for that price pricing policy for multiple types and sizes of instances. For example, each on-demand instance pool 131 may include instances of a common type and size, with the type and size varying between the various on-demand instance pools.

Figure 2:
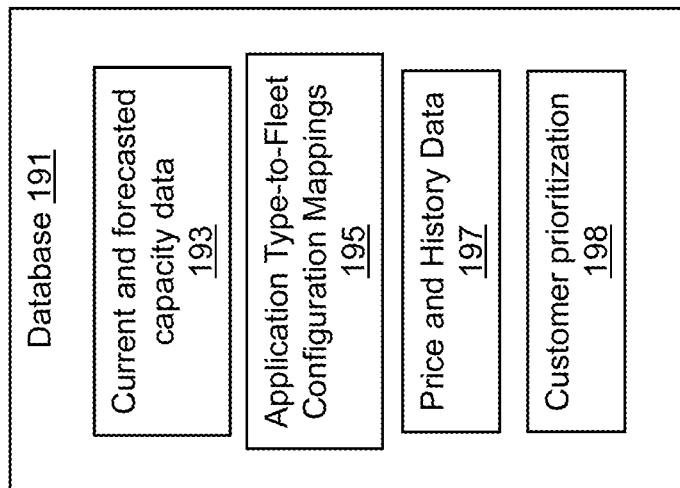
FIG. 2 shows an embodiment of the contents of a database usable by the provider network in accordance with various examples.

FIG. 1 also shows a resource management database 191, which may include a variety of information. The various types of information may be included in one database or in separate databases as desired. FIG. 2 shows an example of the type of information that may be stored in the resource management database 191. The information contained in the database may include current and forecasted capacity data 193, application type-to-fleet configuration mappings 195, price and history data 197, and customer prioritizations 198.

Each instance may be assigned a unique instance identifier. The current and forecasted capacity data 193 may include an identifier of each instance 125 currently running on behalf of each customer and mapped to each such customer. The current and forecasted capacity data 193 also may include information from which the number of available instances (i.e., instances not yet assigned to a customer) in each instance pool can be determined. For example, the capacity data may specify the number of available instances in each pool. The provisioning service 180 may update that number upon assigning one or more instances to a particular customer. The current and forecasted capacity data 193 may also contain a forecast of future instance capacity. For example, based on prior instance usage over time, instance needs in future time periods can be predicted and thus the capacity can be determined as well. If historically, usage is highest from 8 am to 6 pm and lighter overnight, then the current and forecasted capacity data 193 may include an indication of the increased capacity during the overnight hours. A forecast capacity service may run in the background to keep track of historical usage over time and update the predictions of future capacity in the current and forecasted capacity data 193.

The application type-to-fleet configuration mappings 195 may specify one or more parameters about the nature of a fleet based on a given application type. In some embodiments, the types of applications include batch processing, Hadoop applications, scientific computing, video and image processing/rendering, testing, web/data crawling, financial applications, high performance computing applications (e.g., parallel computations), and cheap compute applications (e.g., applications for certain types of games). For example, one type of application that a customer might choose to run may be a web application and a customer may want numerous copies of the web application running in separate instances with a load balancer distributing incoming requests to individual backend application instances. Many balancing algorithms assume that the back-end instances are all of the same type and size. Thus, in one example, mappings 195 may indicate that a web application maps to a fleet configuration for which the instances should all be of the same type (e.g., compute-optimized, memory-optimized, etc.) and/or size (i.e., same number of CPUs, same amount of memory, etc.). In another example, a mapping may specify that for a certain application type, a fleet should be assembled and launched into more than one availability zone 120 to better assure availability in the event of, for example, a large scale event such as a power outage.

In yet another example, an application type-to-fleet configuration mapping 195 may specify that, for a given application type, the instances of the fleet should not be interrupted. As noted above, instances from the spot instance pool 141 may be interrupted if the dynamically adjustable price of a spot instance created for a customer exceeds the specified bid price. Certain types of applications, however, may be intolerant to interruption. For example, a batch processing job run on an instance that terminates before the job completes may lose all data that had been computed before the instance terminated. Some types of applications may be highly tolerant of interruption, while other types of applications are highly intolerant of an interruption, while other application types have varying degrees of tolerance for interruption. The application type-to-fleet configuration mappings 195 may provide an interruption score indicating the degree of interruption tolerance (or intolerance) for each application type. The score may be an integer in a range of 0 to 10, a decimal fraction between 0 and 1, etc. The interruption score alternatively may be expressed as a desired probability of interruption. For example, a 1% interruption probability may mean that the probability that the instances executing the application terminate before the job is completed is 1% (i.e., there is a 99% probability that the job will complete without being interrupted). The customer also can specify to the interface manager 183, for example through an application programming interface (API) call, graphical user interface, etc. how intolerant the customer's job is to being interrupted before it fully completes its task.

The database 191 illustrated in FIG. 2 also includes price and history data 197. Such data includes the current pricing of instances 125 of each type and size in the various pricing schemes (reserved, on-demand and spot). The pricing may vary between the various pricing schemes, even for the same underlying instance type. That is, an instance of a particular type may be available at one price as an on-demand instance and at a different price as a spot instance or a reserved instance. The price and history data 197 includes historical pricing for at least the spot instances. Spot instances have prices that may fluctuate with supply and demand, and such pricing is stored over a period of time (e.g., last 7 days, last month, etc.). Such historical pricing data can be used by the provisioning service 180 in a predictive manner to determine whether spot instances are suitable for a customer and what the bid price should be for the spot instances. For example, for a customer whose application is fairly intolerant of being interrupted, the bid price for spot instances may need to be set relatively high to reduce the risk of the customer losing the instance before the job completes. Further, the historical pricing data for spot instances that otherwise are suitable for the customer's job can be used by the provisioning service 180 to determine a bid price for that customer. The customer thus need not determine the bid price. Rather the provisioning service 180 may set the bid price automatically for the customer based on an assessment of the degree of intolerance the customer's application is to being prematurely interrupted.

The customer prioritizations 198 includes information provided by the customers as to how each such customer wants the various instances and pricing models offered by the service provider to be prioritized. Instances may be prioritized based on their price per hour, with lower priced instance types automatically prioritized ahead of higher priced ones. When a customer wants to provision a given number of cores (with a minimum core to memory ratio, termed a "compute unit"), a customer or the service provider can define (e.g., via the interface manager 183) how many compute units each instance type contains. For example, a medium sized instance type may be defined to contain 1 compute unit (e.g., 1 core with 3.75 GB RAM), a large version of the same class of instances may be defined to contain 4 compute units, and an extra-large version of the same class of instances may be defined to contain 8 compute instances. In this case, instance types may be prioritized based on their price per compute unit (price per instance hour/instance compute units). This configuration enables a customer to provision compute units across the instance family type family, with equal prioritization assigned to all sizes. If the customer wants to further prioritize a larger instance size over a smaller instance size, the weight for the larger instance size can be adjusted to a higher value (e.g., from 8 to 10), causing it to represent the lowest price per compute unit in that particular instance family.

In addition to or instead of customer prioritizations based on instance type/size, customers can set prioritizations in the customer prioritizations 198 based on the purchase model for the instances. Such prioritization information can be provided via the interface manager 183. In the example of FIG. 1, the various purchase models include reserved instances, on-demand instances, and spot instances. Customers can optimize costs by purchasing reserved instances for workloads that are long-term, stable and predictable, or use spot instances for workloads that are interruptible. For example, a customer can request the launch of a mix of reserved, on-demand and spot instances by (1) specifying the minimum capacity required for steady state operations on reserved or on-demand instances, and (2) an hourly budget to request spot instances in order to accelerate the workload during off-peak hours or to optimize costs for limited budget workloads.

Figure 3:
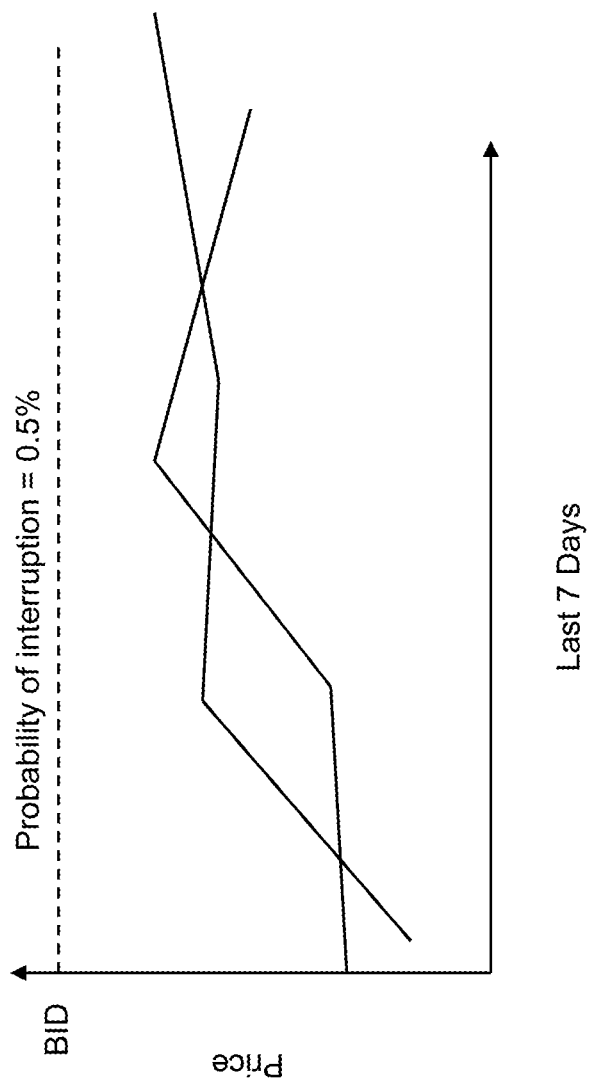
FIG. 3 illustrates an example of the use of historical data in the database in accordance with various examples.

FIG. 3 illustrates historical pricing data for spot instances over the last seven days. For a customer application that is deemed to be highly intolerant of interruption, the 7-day historical pricing data can be used to set a bid price (BID) as shown that is higher than the historical prices. The provisioning service 180, for example, may set BID at a level that is 10% higher than the highest price the instances have had over the last seven days. The provisioning service 180 may determine that for the bid price of BID, the probability of termination of the spot instance may be 0.5%. Bid prices at higher levels will have an even smaller probability of interruption, and bid prices at lower levels will have a larger probability of interruption. Bid prices can be selected by the provisioning service 180 based on the interruption score mapped to the application type (or supplied directly by the user). If the interruption score is expressed as an interruption probability (0.5%, 1%, etc.), the provisioning service 180 may compute a bid price based on the interruption score probability and the historical pricing data. A statistical analysis of the historical pricing data for the interruptible instances over time may be performed by the provisioning service or other logic to produce a mathematical mapping (e.g., linear regression equation) for which an interruption probability is the input value and a bid price is the output value. The customer-specified interruption score/probability thus may be input to the mathematical mapping which computes the bid price.

The provisioning service 180 may assemble a fleet for a customer based on the customer-specified inputs that include all interruptible instances. Assembling a fleet may include proposing a fleet configuration to the customer for confirmation by the customer, or actually launching the fleet without a confirmation from the customer. The interruption score (e.g., mapped to the application type or specified directly by the customer) may be used to determine a bid price for such interruptible instances. Based on the other inputs specified by the customer such as hardware requirements (e.g., number of CPUs, amount of memory, etc.), application type, deadline, per hour pricing, per job pricing, etc., the provisioning service 180 proposes and/or launches a fleet of interruptible instances that satisfies all of the customer requirements. The customer may confirm the proposed fleet such as by selecting a "confirm" button (or equivalent) on a graphical user interface, returning an API to the provisioning service 180 to confirm the proposed fleet, submitting a confirmation message on a command line interface, etc.

In some embodiments, the provisioning service 180 may propose a fleet for a customer that includes a combination of interruptible and non-interruptible instances. As noted above, an interruptible instance is one that can be terminated by the provider network once the current price for the instance exceeds the bid price. A non-interruptible instance is one in which any price increases will not cause the instance to be terminated for a customer. The provisioning service 180 may use the interruption probability score, along with the other customer-specified inputs, to select a bid price for the interruptible instances. The provisioning service 180 will use all of the customer-specified inputs, other than the interruption probability score, to select non-interruptible instances. For example, the provisioning service may propose a fleet of 10 instances of a particular type that comply with the hardware requirements specified by the customer and any other customer-specified requirement (deadline, budget, etc.). For example, the fleet may comprise five on-demand instances and 5 interruptible instances, all of the same type and size.

As the customer does not specify the type of the actual instance in many embodiments, the provisioning service 180 may propose a fleet that comprises instances of different types and/or different sizes. For example, a compute-optimized instance may be selected, but with two or more different sizes of that particular instance. One size differs from another size in terms of the number of CPUs, amount of memory, storage, etc. A "medium" size might have 2 CPUs and 2 GB of memory while a "large" size might have 4 CPUs and 4 GB of memory. By way of another example, the provisioning service 180 may propose a fleet that comprises instances of the same size but of different types. The fleet, for example, may have all "medium" sized instances, but half the instances in the fleet may be compute-optimized and the other half includes general purpose instances. Further still, the mix of instances in the fleet may have instances of different types and of different sizes. The instances in the proposed fleet may be designated by the provisioning service 180 to execute in the same availability zone, or in different availability zones.

The provisioning service 180 permits customers to create fleets of instances without having to specify specific instance types (e.g., general purpose, compute-optimized, memory optimized, etc.). In fact, the customer need not even be aware of the various types of instances offered by the service provider. The customer specifies one or more hardware requirements for each instance to be included in the fleet, and one or more other pieces of information such as the type of application or job the customer intends to run on the fleet, a budget the customer is willing to pay, how many hours the customer anticipates the job taking to complete, and a deadline for when the job must be completed. The provisioning service 180 determines a suitable mix of instances to form a fleet that satisfies the requirements specified by the customer. In some embodiments, the proposed fleet may be specified by the service provider to execute in a common availability zone, while in other embodiments, different portions of the fleet may be designated for execution in different availability zone.

The provisioning service 180 may determine that a fleet of instances cannot be created that matches the customer's requirements. For example, the customer may have specified that a batch processing job may take 8 hours to complete and must be completed within a budget of $125 using instances that include only 1 CPU per instance. If the provisioning service 180 determines that the customer's budget cannot be met given the other customer-specified constraints, the provisioning service 180 may provide a feedback indicator to the customer of the problem and suggest that the customer should modify one or more of the input constraints (e.g., increase the budget, specify more CPUs per instance, etc.). The customer then may modify the input constraints and the provisioning service 180 may determine whether a fleet can be assembled given the new set of input constraints.

Figure 4:
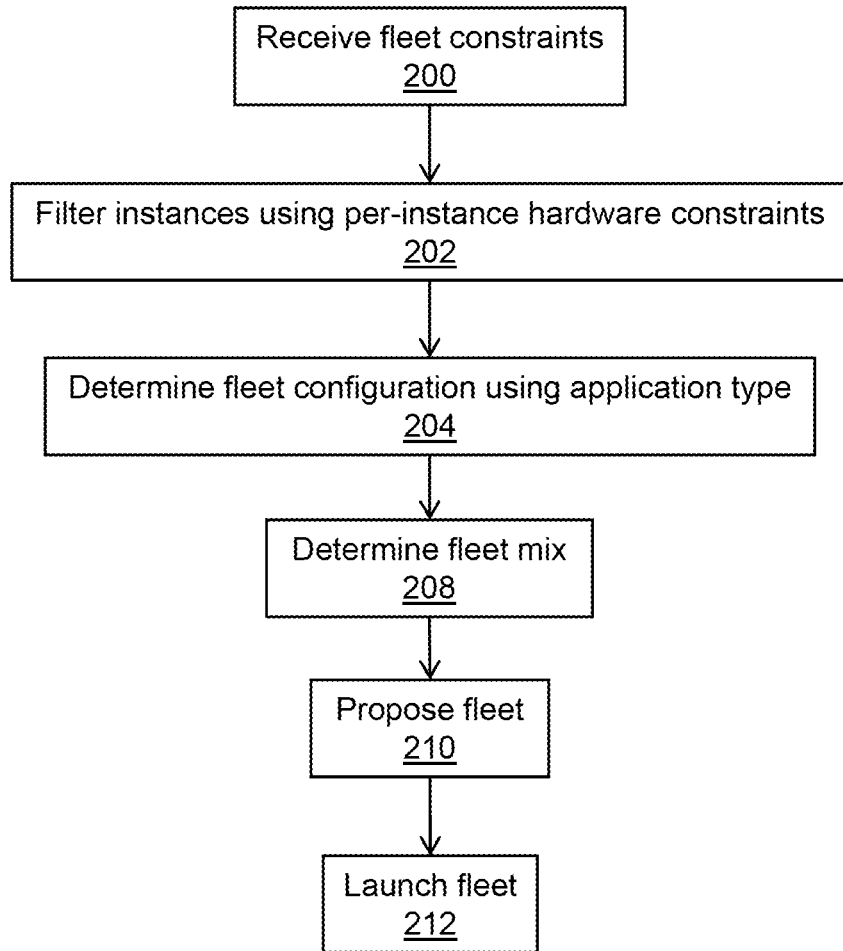
FIG. 4 shows a method in accordance with various embodiments.

FIG. 4 illustrates an example of a method implemented by, for example, the provisioning service 180. The operations may be performed in the order shown, or in a different order. Further, the operations may be performed sequentially, or two or more of the operations may be performed concurrently.

At 200, the method includes receiving the fleet constraints. This operation may be performed by a customer submitting the constraints through a web interface, an API, a command interface, etc. The fleet constraints may be provided by the customer through drop-down lists in a graphical user interface (GUI), data entry fields in the GUI, arguments to an API call, etc. The fleet constraints may include one or more hardware constraints for each instance to be included in the field. Examples of hardware constraints include the number of CPUs (either physical or virtual CPUs), the amount of random access memory, whether mass storage (e.g., hard drive, solid state storage, etc.) is to be provided locally to each instance or remotely from the instances, etc. In example embodiments, the customer can specify the amount of hardware resources desired to run the application (e.g., 2 CPUs, 8 GiB of RAM, 60 GB or storage) or the hardware constraints may be presented to customers in the form of instance types, where each instance type may have a combination of compute capacity (e.g., number and/or type of CPUs), memory, bandwidth, or storage. The fleet constraints also may include any one or more of: the type of application the customer intends to execute on the fleet (e.g., batch processing job, web application, etc.), the budget for the job such as a per-hour budget and/or total budget to complete the job, the deadline for completing the job, an interruption score, and the amount of total capacity. The interruption score may be explicitly specified by the customer or determined from mappings 195 based on the type of application specified by the customer. The interruption score reflects the probability of interruption with respect to using instances that are interruptible (i.e., Spot market instances) using predictive analytics, e.g., regression analysis based algorithms. With this class of instances, the highest bidder is allocated the instance. As such, when the bid price that the user is willing to pay for the fleet is lowered, the probability of interruption rises. In example embodiments, the service provider can calculate the interruption score using historical data of the price for each instance type.

At 202, the method includes filtering the complete set of instances offered by the service provider based on the hardware constraints specified by the customer. For example, if the customer specifies that each instance should have at least 2 CPUs and 2 GiB of memory, then all instances that have only 1 CPU and/or less than the 2 GB of memory are excluded from further consideration. The results of the filtering operation at 202 include just those instances that at least match the customer-specified hardware constraints. In an example embodiment, the provisioning service can use the constraints to filter a list of instance types offered by the service provider.

At 204, the provisioning service 180 determines a full or partial configuration for the fleet based on the application type received from the customer. The fleet configuration may specify whether the fleet is to be launched in one availability zone, split among multiple availability zones, etc. This operation may be implemented by the provisioning service 180 accessing the application type-to-fleet configuration mappings 195 of database 191 and mapping the customer-specified application type to one or more fleet configuration settings.

For example, the customer may have indicated the intention to have a batch job executed on his fleet of instances. The application type-to-fleet configuration mappings 195 (e.g., a text string formatted for reading by the provisioning service) can be generated by an administrator of the provisioning service and/or the customer by testing different instance types for different application types and creating tables that include mappings that work and/or are optimal to complete the work. The application type-to-fleet configuration mappings 195 may specify instance types that the provisioning service can use for a given application type. Example application types include batch processing, Hadoop/MapReduce processing jobs (e.g., search and big data), scientific computing, video and image processing, testing, web, financial, high-performance computing, graphics intensive workloads, etc. In this example, the application type-to-fleet configuration mappings 195 for a batch job may specify that, for a batch job, the fleet configuration should have the characteristics that the instances are compute-optimized (relative to other instances offered by the service provider) and that a mix of different instance types is permitted. The resource management database 191 may have metadata information as to the various types of instances available in the provider network, such as which instances are compute-optimized, which are memory-optimized, etc., and the provisioning service 180 may access the database 191 to determine whether a fleet of instances can be assembled that complies with these characteristics.

As another example, the customer may have indicated the intention to have a web application executed on his fleet of instances. The application type-to-fleet configuration mappings 195 may specify that, for a web application, the fleet configuration should have the characteristics that the instances should all be of the same type and that no more than 50% of the fleet should be located in the same availability zone (or same rack, spine, etc.). The database 191 (e.g., the current and forecasted capacity data 193) may indicate the instances that are available by instance type, pricing model, availability zone, rack identifier, etc. The provisioning service 180 may access the resource management database 191 to determine whether a fleet of instances can be assembled that complies with the characteristics noted above.

At 206, the method determines an interruption score. The interruption score can be determined in different ways. For example, a customer may directly provide an indication as to whether the instances of the fleet can be interrupted such as through a yes/no check box or an interruption score. The interruption score may be specified in the application type-to-fleet configuration mappings 195 based on the type of application the customer wants to have executed. That is, some applications may be less tolerant of interruption than other applications. The interruption score may be a value within a range of possible value such as a range of 1 to 5 where 1 means to avoid terminations and 5 means that the customer is much more tolerant of instances being prematurely terminated and 2, 3 and 4 are varying degrees of termination tolerance between 1 and 5. In some embodiments, the interruption score may indicate that interruption is freely permitted. The customer may specify the interruption score as a probability as noted above.

At 208, the method includes the provisioning service 180 generating a mix of instances for a fleet for the customer using the interruption score, one or more of the customer-specified fleet constraints, the fleet configurations determined at 204, and the current and forecasted capacity data 193 from the database 191. In an embodiment, the provisioning service can use the hardware constraints, interruption score, and the fleet configurations to search a database to generate a mix of instances for the fleet. For example, the fleet configurations can be used to identify instance types that can be used to generate the fleet. Next, the provisioning service can filter out instance types that do not satisfy the hardware constraints. Similarly, the provisioning service can filter out instance types that do not satisfy the budget constraints (e.g., instance types that have Spot prices higher than a bid price) and he interruption score may be used to determine whether interruptible instances (e.g., Spot instances) are to be used and, if so, a bid price for spot instances and, if allowed, the number and type of Spot instances to use. This operation may be implemented by the provisioning service accessing the price and history data 197 of database 191 specifically to access the historical pricing data and compute the likelihood that an instance will be interrupted at different Spot prices. As explained above, a bid price can be computed based on the historical pricing data and a specified probability (interruption score) for an interruption to occur. The provisioning service can then select instance types and a number of instances to satisfy a capacity value specified by the customer, the interrupt score, and a budget. There may be multiple different fleets of instances that may satisfy the bid price, fleet constraints, and fleet configurations. The provisioning service may generate a fleet for the customer that is the least expensive fleet. The price and history data 197 includes the current per-unit time pricing of the instances. For each possible fleet of instances that the provisioning service 180 may generate, the provisioning service can access the price and history data 197 to determine the per-unit time cost of each instance and thus also the total per-unit time cost of the entire fleet. The customer prioritizations 198 may be used during the fleet generation process to determine which types of instances to include in the mix and at which purchase models. For example, if the customer prioritizations is based on price (e.g., lowest price fleet), the provisioning service may generate a predetermined maximum number of fleets (e.g., 5 options for fleets) that are ranked in order based on price (e.g., lowest priced fleet, second lowest priced fleet, etc.). If the customer prioritization is for on-demand instances, then the fleets generated and presented to the customer should include on-demand instances and may rank such fleets based on total fleet price.

In one example, a customer may specify a budget and deadline for a job. For example, a job must complete by a certain time and date at a total cost equal to or less than a certain monetary value. The customer also may specify a parameter as to the amount of time the job may take to execute. The provisioning service may access the database 191 to generate one or more possible fleets for the customer to use that will complete the job by the deadline without exceeding the monetary value threshold. The customer, for example, may specify that the job will take 2 hours to execute using 10 instances that have 2 vCPUs. The provisioning service can assemble a fleet that has 10 such instances or fewer or more than 10 instances. A fleet with more than 10 instances may take less than 2 hours to complete and a fleet with fewer than 10 instances may take longer than 2 hours to complete. The provisioning service computes the number of hours remaining until the customer-specified deadline, and then generates one or more fleets of instances that will complete the job by the deadline even though each fleet may take more or less than 2 hours to execute given the fleet specifics such as number of instances in the fleet. The provisioning service 180 may generate a fleet with only 2 instances, which may take 10 hours of execution time to complete the job, but such a fleet is acceptable if the deadline is more than 10 hours into the future. At 210, the method includes proposing the fleet to the customer for the customer to confirm. Alternatively, the provisioning service may propose multiple possible fleets along with the total cost to complete the job and/or per hour cost. The customer can then choose the particular fleet to launch, which may or may not be the least expensive option. The provisioning service 180 may take the capacity data into account. For example, if each of two separate pools of instances can be used given the customer-specified hardware requirements, the provisioning service 180 may choose the pool with largest number of availability instances.

Finally, at 212 the method includes launching the fleet. This operation may include the customer confirming a proposed fleet of instances and then loading the virtual machine instances on one or more physical server computers, loading operating systems, assigning internet protocol (IP) addresses to the instances, etc. The provisioning service 180 may launch the fleet automatically on behalf of the customer, prompt a customer for confirmation before launching the fleet, or permit the customer to launch the fleet at a later time or date.

Figure 5:
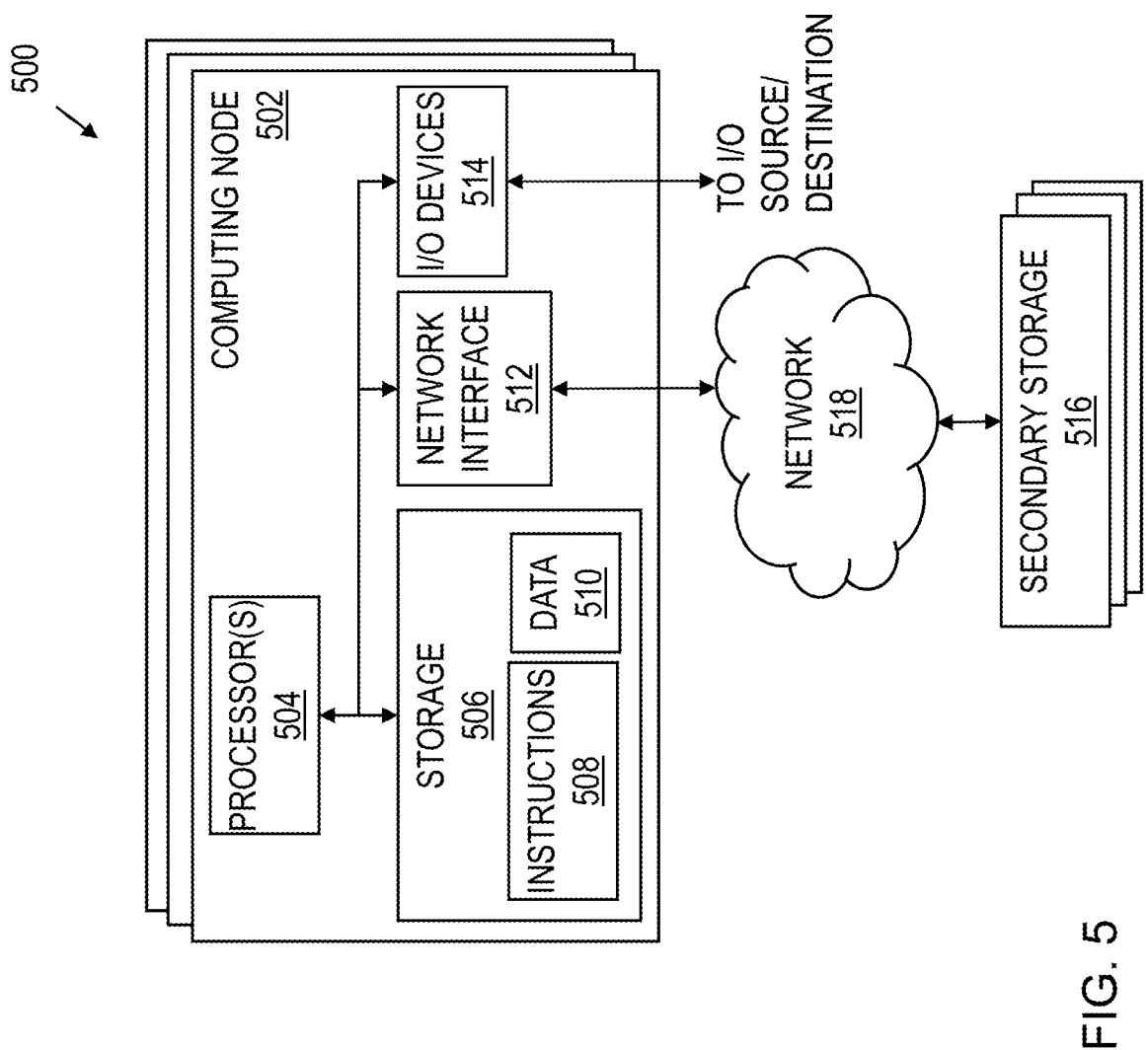
FIG. 5 shows an illustrative architecture of a computing device that can be used to implement the various components of the system described herein in accordance with various examples.

FIG. 5 shows a schematic diagram for a computing system 500 suitable for implementation of the service provider network 110, including the functionality provisioning service 180 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the provisioning service 180.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 110, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the provisioning service 180 including the interface manager 183 and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the provisioning service 180 and interface manager 183 and other components described herein may be implemented as a separate computing device 502 executing software to provide the computing node with the functionality described herein. In some embodiments, the provisioning service 180 and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a competing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing device 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
one or more compute nodes configured to implement a user interface, a provisioning service, and a database, wherein each compute node comprises a hardware processor coupled to a memory, wherein the database includes virtual machine instance availability data indicating the availability of virtual machine instances, current and historical virtual machine instance cost data, and mappings between application types and virtual machine instance fleet configurations, and wherein each virtual machine instance has a type selected from one of multiple different types, each virtual machine instance type pertaining a combination of (a) a number of central processing units, (b), an amount of memory, and (c) number of network ports;
wherein the user interface is configured to receive customer-specified hardware constraints of virtual machine instances, an indication of a type of application to be executed on the virtual machine instances, and a budget value for execution of the virtual machine instances;
wherein, using the customer-specified hardware constraints and the indication of the type of application and without a customer specifying the type of virtual machine instances to be included in a fleet of virtual machine instances to execute the application, the provisioning service is configured to access the availability data and the mappings in the database to generate a proposed fleet of virtual machine instances that conforms to the budget value, wherein the proposed fleet specifies a number of virtual machine instances and the type for each of the virtual machine instances.

2. The system of claim 1, wherein the customer-specified hardware constraints include at least one of: a number of central processing units (CPUs), an amount of memory, and a configuration for disk storage, and wherein the application type includes one of: batch processing, a web application, Hadoop applications, scientific computing, video and image processing/rendering, testing, web and data crawling, financial applications, and high performance computing applications.

3. The system of claim 1, wherein the provisioning service is configured to:
filter available virtual machine instances using the hardware constraints; and
determine a configuration for the proposed fleet using the type of application and the mappings.

4. The system of claim 1, wherein:
the user interface is configured to receive an interruption score for the virtual machine instances to be included in the proposed fleet; and the provisioning service is configured to determine the proposed fleet using the historical virtual machine instance cost data, the interruption score, customer prioritization values for the fleet, instance capacity data, and purchase options for the fleet.

5. The system of claim 1, wherein the provisioning service is configured to:
use the application type to retrieve an interruption score from the database;
compute a bid value for interruptible virtual machine instances using the historical virtual machine instance cost data and the interruption score; and
select interruptible virtual machine instances for the proposed fleet based on the computed bid value and a current value of available interruptible virtual machine instances.

6. A non-transitory, computer-readable storage device includes program instructions which, when executed by one or more processors, causes the one or more processors to:
implement a user interface, a provisioning service, and a database, wherein each compute node comprises a hardware processor coupled to a memory, wherein the database includes virtual machine instance availability data indicating the availability of virtual machine instances, current and historical virtual machine instance cost data, and mappings between application types and virtual machine instance fleet configurations, and wherein each virtual machine instance has a type selected from one of multiple different types, each virtual machine instance type pertaining a combination of (a) a number of central processing units, (b), an amount of memory, and (c) number of network ports;
wherein the user interface is configured to receive customer-specified hardware constraints of virtual machine instances, an indication of a type of application to be executed on the virtual machine instances, and a budget value for execution of the virtual machine instances;
wherein, using the customer-specified hardware constraints and the indication of the type of application and without a customer specifying the type of virtual machine instances to be included in a fleet of virtual machine instances to execute the application, the provisioning service is configured to access the availability data and the mappings in the database to generate a proposed fleet of virtual machine instances that conforms to the budget value, wherein the proposed fleet specifies a number of virtual machine instances and the type for each of the virtual machine instances.

7. The non-transitory, computer-readable storage device of claim 6, wherein the customer-specified hardware constraints include at least one of: a number of central processing units (CPUs), an amount of memory, and a configuration for disk storage, and wherein the application type includes one of: batch processing, a web application, Hadoop applications, scientific computing, video and image processing/rendering, testing, web and data crawling, financial applications, and high performance computing applications.

8. The non-transitory, computer-readable storage device of claim 6, wherein the provisioning service is configured to:
filter available virtual machine instances using the hardware constraints; and
determine a configuration for the proposed fleet using the type of application and the mappings.

9. The non-transitory, computer-readable storage device of claim 6, wherein:

the user interface is configured to receive an interruption score for the virtual machine instances to be included in the proposed fleet; and
the provisioning service is configured to determine the proposed fleet using the historical virtual machine instance cost data, the interruption score, customer prioritization values for the fleet, instance capacity data, and purchase options for the fleet.

10. The non-transitory, computer-readable storage device of claim 6, wherein the provisioning service is configured to:
use the application type to retrieve an interruption score from the database;
compute a bid value for interruptible virtual machine instances using the historical virtual machine instance cost data and the interruption score; and
select interruptible virtual machine instances for the proposed fleet based on the computed bid value and a current value of available interruptible virtual machine instances.

11. A method, comprising:
implementing a user interface, a provisioning service, and a database on one or more compute nodes, wherein each compute node comprises a hardware processor coupled to a memory, wherein the database includes virtual machine instance availability data indicating the availability of virtual machine instances, current and historical virtual machine instance cost data, and mappings between application types and virtual machine instance fleet configurations, and wherein each virtual machine instance has a type selected from one of multiple different types, each virtual machine instance type pertaining a combination of (a) a number of central processing units, (b), an amount of memory, and (c) number of network ports;
receiving, via the user interface, customer-specified hardware constraints of virtual machine instances, an indication of a type of application to be executed on the virtual machine instances, and a budget value for execution of the virtual machine instances
using the customer-specified hardware constraints and the indication of the type of application and without a customer specifying the type of virtual machine instances to be included in a fleet of virtual machine instances to execute the application, accessing, by the provisioning service, the availability data and the mappings in the database to generate a proposed fleet of virtual machine instances that conforms to the budget value, wherein the proposed fleet specifies a number of virtual machine instances and the type for each of the virtual machine instances.

12. The method of claim 11, wherein the customer-specified hardware constraints include at least one of: a number of central processing units (CPUs), an amount of memory, and a configuration for disk storage, and wherein the application type includes one of: batch processing, a web application, Hadoop applications, scientific computing, video and image processing/rendering, testing, web and data crawling, financial applications, and high performance computing applications.

13. The method of claim 11, further comprising:
filtering available virtual machine instances using the hardware constraints; and
determining a configuration for the proposed fleet using the type of application and the mappings.

14. The method of claim 11, further comprising:
receiving an interruption score for the virtual machine instances to be included in the proposed fleet; and determining the proposed fleet using the historical virtual machine instance cost data, the interruption score, customer prioritization values for the fleet, instance capacity data, and purchase options for the fleet.

15. The method of claim 11, further comprising:

using the application type to retrieve an interruption score from the database;

computing a bid value for interruptible virtual machine instances using the historical virtual machine instance cost data and the interruption score; and selecting interruptible virtual machine instances for the proposed fleet based on the computed bid value and a current value of available interruptible virtual machine instances.

* * * * *